United States Patent
Lee et al.

(10) Patent No.: US 12,079,131 B2
(45) Date of Patent: *Sep. 3, 2024

(54) MEMORY SYSTEM AND OPERATING METHOD THEREOF

(71) Applicant: SK hynix Inc., Icheon-si (KR)

(72) Inventors: Jooyoung Lee, Seoul (KR); Hoeseung Jung, Seoul (KR)

(73) Assignee: SK HYNIX INC., Icheon-si (KR)

( * ) Notice: Subject to any disclaimer, the term of this patent is extended or adjusted under 35 U.S.C. 154(b) by 45 days.

This patent is subject to a terminal disclaimer.

(21) Appl. No.: 17/743,014

(22) Filed: May 12, 2022

(65) Prior Publication Data
US 2022/0269613 A1    Aug. 25, 2022

Related U.S. Application Data

(63) Continuation of application No. 16/909,719, filed on Jun. 23, 2020, now Pat. No. 11,334,493.

(30) Foreign Application Priority Data

Oct. 31, 2019   (KR) ........................ 10-2019-0137814

(51) Int. Cl.
*G06F 12/0882* (2016.01)
*G06F 9/50* (2006.01)
(Continued)

(52) U.S. Cl.
CPC ........ *G06F 12/0882* (2013.01); *G06F 9/5016* (2013.01); *G06F 9/505* (2013.01);
(Continued)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 5,142,670 A * 8/1992 Stone .................. G06F 11/3409
                                                 711/E12.019
5,566,348 A * 10/1996 Dahman ............... G06F 12/127
                                                 711/E12.076

(Continued)

FOREIGN PATENT DOCUMENTS

KR    10-2009-0050851 A    5/2009
KR    10-2018-0017608 A    2/2018

(Continued)

OTHER PUBLICATIONS

Z. Shi, K. Lu, X.-P. Wang and W.-Z. Zhang, "Dynamic Page Size Adjustment in Operating System," 2016 International Conference on Information System and Artificial Intelligence (ISAI), Hong Kong, China, 2016, pp. 24-28, doi: 10.1109/ISAI.2016.0015. (Year: 2016).*

(Continued)

*Primary Examiner* — Daniel C. Chappell
(74) *Attorney, Agent, or Firm* — Perkins Coie LLP

(57) ABSTRACT

A memory system is provided to include a memory device including a plurality of memory blocks and a controller for dynamically changing a size of a write buffer based on whether a current workload is a sequential workload or a mixed workload. The controller includes a workload detecting unit suitable for changing current workload from the sequential workload to the mixed workload based on a read count, or from the mixed workload to the sequential workload based on a write count and a write buffer managing unit suitable for reducing the size of the write buffer when the current workload is changed to the mixed workload.

20 Claims, 13 Drawing Sheets

(51) Int. Cl.
*G06F 9/54* (2006.01)
*G06F 12/02* (2006.01)
*G06F 12/0846* (2016.01)

(52) U.S. Cl.
CPC .......... *G06F 9/544* (2013.01); *G06F 12/0246* (2013.01); *G06F 12/0851* (2013.01)

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 9,104,583 | B2* | 8/2015 | Ambroladze | ....... G06F 12/0895 |
| 2008/0034153 | A1 | 2/2008 | Lee | |
| 2009/0307691 | A1* | 12/2009 | Moscibroda | ........ G06F 13/1652 |
| | | | | 718/100 |
| 2019/0018613 | A1* | 1/2019 | Byun | ...................... G06F 3/061 |
| 2020/0004540 | A1 | 1/2020 | Navon | |
| 2021/0133111 | A1* | 5/2021 | Lee | ...................... G06F 12/0851 |

FOREIGN PATENT DOCUMENTS

| | | |
|---|---|---|
| KR | 10-2020-0032921 A | 3/2020 |
| KR | 10-2019-0005670 A | 10/2021 |

OTHER PUBLICATIONS

L. Chen et al., "An Elastic Task Scheduling Scheme on Coarse-Grained Reconfigurable Architectures," in IEEE Transactions on Parallel and Distributed Systems, vol. 32, No. 12, pp. 3066-3080, Dec. 1, 2021, doi: 10.1109/TPDS.2021.3084804. (Year: 2021).*

Y. Taguchi and T. Yoshinaga, "System Resource Management to Control the Risk of Data-Loss in a Cloud-Based Disaster Recovery," 2018 IEEE 42nd Annual Computer Software and Applications Conference (COMPSAC), Tokyo, Japan, 2018, pp. 210-215, doi: 10.1109/COMPSAC.2018.10231. (Year: 2018).*

Jen-Yao Chwng, et al., "Goal-oriented dynamic buffer pool management for data base systems," Proceedings of First IEEE International Conference on Engineering of Complex Computer Systems. ICECCS'95, Ft. Lauderdale, FL, USA, 1995, pp. 191-198, doi: 10.1109/ICECCS.1995.479328. (Year: 1995).*

Mohamed, A.H. et al., "A scheme for implementing address translation storage buffers," IEEE CCECE2002. Canadian Conference on Electrical and Computer Engineering. Conference Proceedings 2002, pp. 626-633, vol. 2.

Diao, Y. et al., "Using MIMO linear control for load balancing in computing systems." Proceedings of the 2004 American Control Conference, 2004, pp. 2045-2050, vol. 3.

Diao, Y. et al., "Incorporating cost of control into the design of a load balancing controller." Proceedings. RTAS 2004. 10th IEEE. Real-Time and Embedded Technology and Applications Symposium, 2004, pp. 376-385.

Kassela, E. et al., "Automated workload-aware elasticity of NoSQL clusters in the cloud." 2014 IEEE International Conference on Big Data 2014, pp. 195-200.

Office Action mailed Apr. 22, 2024, for KR Patent Application No. 10-2019-0137814, 9 pages with English translation.

* cited by examiner

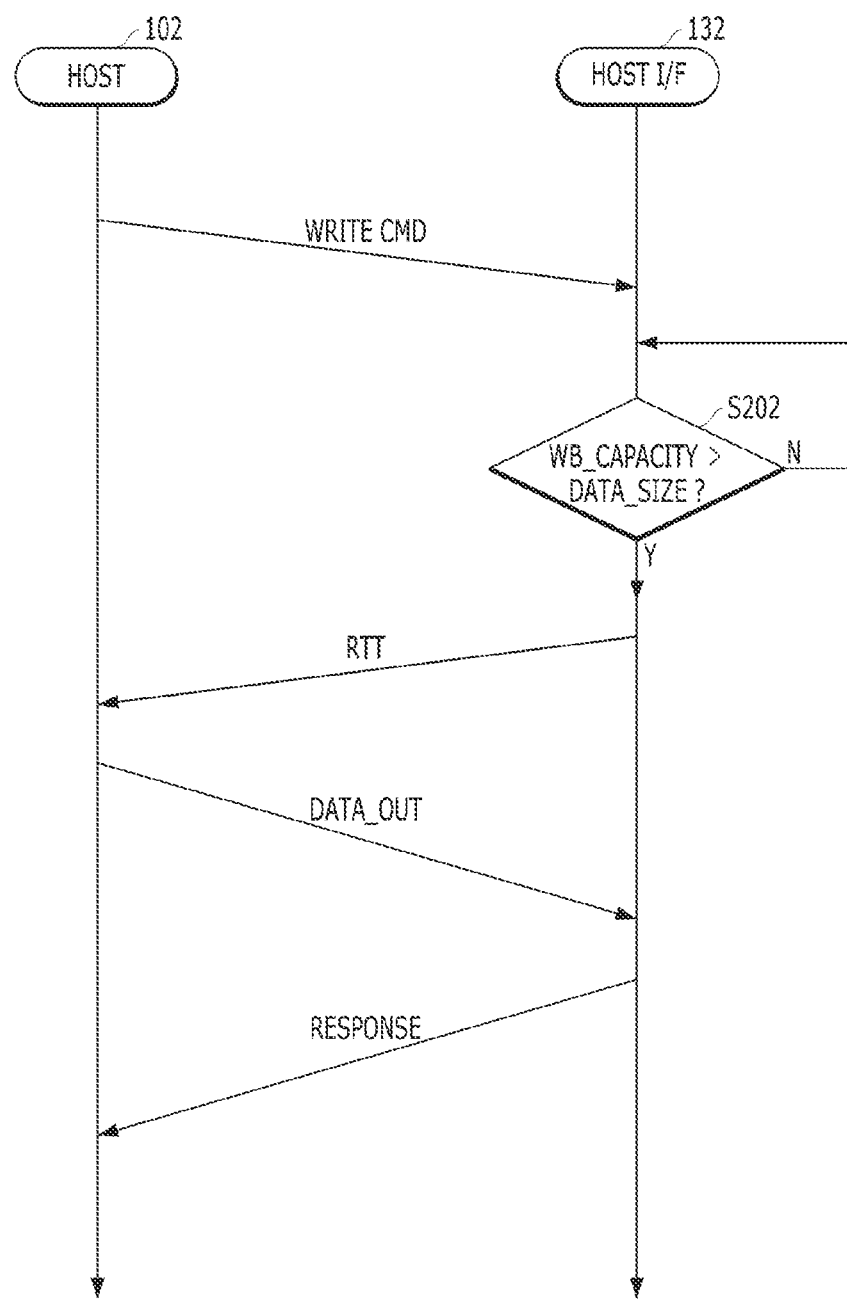

MEMORY SYSTEM AND OPERATING METHOD THEREOF

CROSS-REFERENCE TO RELATED APPLICATIONS

This patent document is a continuation of U.S. patent application Ser. No. 16/909,719, filed on Jun. 23, 2020, which claims priority of Korean Patent Application No. 10-2019-0137814, filed on Oct. 31, 2019, which are incorporated herein by reference in their entireties.

TECHNICAL FIELD

Exemplary embodiments of the disclosed technology relate to a memory system that performs at least one of read or program operation.

BACKGROUND

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since as the memory systems do not need with a mechanical driving unit. Examples of memory systems having such advantages include universal serial bus (USB) memory devices, memory cards having various interfaces, and solid state drives (SSD).

SUMMARY

Various implementations of the disclosed technology relate to a memory system capable of dynamically changing the size of a write buffer based on a workload.

In accordance with an implementation of the disclosed technology, a memory system is provided to include: a memory device including a plurality of memory blocks; and a controller suitable for dynamically changing a size of a write buffer based on whether a current workload is a sequential workload in which write commands are consecutively provided or a mixed workload in which read commands are provided between write commands together with the write commands, wherein the controller includes: a workload detecting unit suitable for respectively increasing a write count for the write commands and a read count for the read commands when a write command and a read command are received, initializing the write count when the read command is received, detecting the current workload to be a mixed workload when the read count is greater than a first threshold value, and detecting the current workload to be a sequential workload when the write count is greater than a second threshold value; and a write buffer managing unit suitable for reducing the size of the write buffer when the mixed workload is detected.

In accordance with another implementation of the disclosed technology, a memory device including a plurality of memory blocks; and a controller coupled to the memory device and configured to receive write commands from a host outside of and in communication with the memory system, the controller including a memory within which a write buffer resides, wherein the controller comprises: a workload detecting unit configured to increase a read count in response to a read command received when a current workload is a sequential workload, and change the current workload to a mixed workload in response to the read count greater than a first threshold value; and a write buffer managing unit communicatively coupled to the workload detecting unit and the memory configured to change the size of the write buffer inside the memory in response to changing the current workload to the mixed workload so that the write buffer is operable to have a memory size that is dynamically changeable based on whether the current workload is changed to the mixed workload or the sequential workload.

In accordance with another implementation of the disclosed technology, a method for operating a memory system is provided. The method includes: respectively increasing a write count for a write command and a read count for a read command when the write command and the read command are received; initializing the write count when the read command is received; detecting a current workload to be a mixed workload when the read count is greater than a first threshold value; detecting the current workload to be a sequential workload when the write count is greater than a second threshold value; and dynamically changing a size of the write buffer based on whether the current workload is the mixed workload in which read commands are provided between write commands together with the write commands or the sequential workload in which the write commands are consecutively provided, wherein the dynamically changing the size of the write buffer includes: reducing the size of the write buffer when the mixed workload is detected.

In accordance with another implementation of the disclosed technology, a method for operating a memory system is provided. The method includes receiving a command from a host; determining a type of the command, the type being either a read command or a write command; increasing, when a current workload is a sequential workload, a read count in response to a read command received; changing the current workload to a mixed workload in response to the read count greater than a first threshold value; and dynamically changing a size of a write buffer based on whether the current workload is changed to the mixed workload or the sequential workload, wherein the dynamically changing the size of the write buffer includes reducing the size of the write buffer when the current workload is changed to the mixed workload.

BRIEF DESCRIPTION OF THE DRAWINGS

FIG. 2 is a flowchart describing an example of a communication process between a host interface unit and a host.

DETAILED DESCRIPTION

Figure 1:
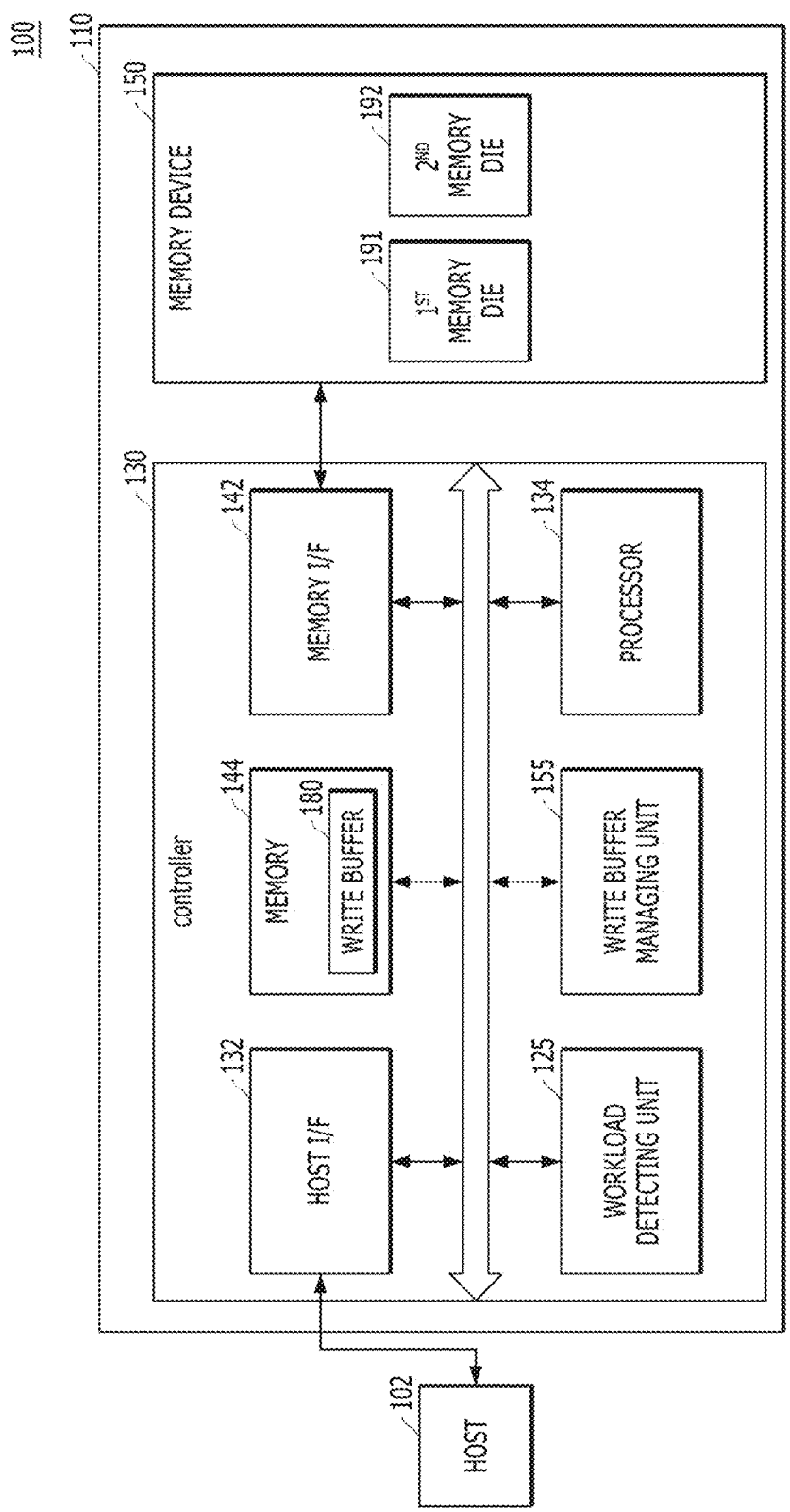
FIG. 1 is a block diagram schematically illustrating an example of a data processing system including a memory system in accordance with an embodiment of the disclosed technology.

Exemplary embodiments of the disclosed technology will be described below in more detail with reference to the accompanying drawings. The disclosed technology can be embodied in different forms and should not be construed as limited to the embodiments set forth herein. Throughout the disclosure, like reference numerals refer to like parts throughout the various figures and embodiments of the disclosed technology.

FIG. 1 is a block diagram illustrating a data processing system 100 including a memory system 110 in accordance with an embodiment of the disclosed technology.

Referring to FIG. 1, the data processing system 100 may include a host 102 operatively coupled to the memory system 110.

The host 102 may include any of a variety of portable electronic devices such as a mobile phone, a MP3 player, a laptop computer, or any others. The host 102 may include any of a variety of non-portable electronic devices such as a desktop computer, a game machine, a TV, a projector, or others.

The host 102 may include at least one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, for example, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC), an embedded MMC (eMMC), or others.

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), a flash memory, or others.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, an UFS device, or others. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies, and each memory die may include a plurality of planes (not shown). As shown in FIG. 1, the memory device 150 may include a first memory die 191 and a second memory die 192. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

In some implementations, the controller 130 may include a host interface (I/F) 132, a processor 134, a memory interface 142, and a memory 144, all operatively coupled or engaged via an internal bus. As described above with reference to FIG. 11, the controller 130 may further include a workload detecting unit 125 and a write buffer managing unit 155.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI), or integrated drive electronics (IDE). The host interface 132 may be driven via a firmware, for example, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include a garbage collection (GC) operation, a wear-leveling (WL) operation, a map flush operation and a bad block management operation.

FIG. 2 is a flowchart describing a communication process between a host interface unit and a host.

To store data in the memory system 110, the host 102 may provide a write command, a logical address, and program data to the host interface unit 132. In response to receiving the write command, the controller 130 temporarily stores the program data in a write buffer 180. The controller 130 determines whether the size of data to be programmed ('the program data') satisfies a programmable condition of the memory device 150, e.g., the program data corresponds to a size (for example, a page size or a one-shot size). Upon determining that the size of the program data satisfies the programmable condition, the controller 130 may control the memory device 150 to program the program data in an open block. While the storage space of the write buffer 180 is limited, the controller 130 may not store the program data in the writer buffer 180, when the size of the program data provided from the host 102 is larger than an available space of the write buffer 180.

In a data processing system having a universal flash storage (UFS) interface, when the host 102 outputs a write command, the memory system 110 can detect the remaining space of the write buffer 180. When it is confirmed that the write buffer 180 has the capacity for storing program data corresponding to the write command, the memory system 110 may provide a Ready-To-Transfer (RTT) signal to the host 102. The RTT signal may be provided by the memory system 110 to the host 102 when the memory system 110 is ready to receive program data from the host 102. The host 102 may provide program data corresponding to a write command to the memory system 110 in response to the RTT signal. The host 102 may output program data corresponding to a write command only when the RTT signal is provided from the memory system 110. The memory system 110 may receive program data from the host 102 only when the write buffer 180 secures the available storage space of a sufficient size to store the program data.

Referring to FIG. 2, the host 102 may provide a write command WRITE CMD to the host interface unit 132, the write command WRITE CMD corresponding to the request for the memory system 110 to perform a program operation.

In step S202, the host interface unit 132 may compare the remaining capacity WB_CAPACITY of the write buffer 180 with the size DATA_SIZE of program data corresponding to the write command.

When the remaining capacity WB_CAPACITY of the write buffer 180 is larger than the size DATA_SIZE of the program data ('Y' in the step S202), the host interface unit 132 may provide an RTT signal to the host 102. When the available capacity WB_CAPACITY of the write buffer 180 is equal to or smaller than the size DATA_SIZE of the program data, the host interface unit 132 may not output the RTT signal.

The host 102 may provide program data DATA_OUT to the host interface unit 132 in response to the RTT signal. The host interface unit 132 may receive the program data DATA_OUT, store it in the write buffer 180, and provide a response signal RESPONSE to the host 102.

Since the host interface unit 132 receives the program data from the host 102 based on the available capacity of the write buffer 180, the size of the write buffer 180 may determine when to perform a program operation as described below with reference to FIGS. 4A and 4B. As the size of the write buffer 180 increases, time to take to receive the program data after the write command is provided from the host 102 can be shortened. In some cases, the program operation may be performed immediately after the write command is provided. When the size of the write buffer 180 is small, the available capacity of the write buffer 180 may be insufficient. In this case, even though the host interface unit 132 receives the write command, it needs to wait until the available capacity becomes sufficient to store the program data, and thus it would take more time to receive program data. Thus, when the size of the write buffer 180 is small, the program operation may be delayed and the program operation may be performed after a considerably long time passes from when the write command is provided. When the program operation is delayed, the number of memory dies in an idle state may increase. Since the controller 130 may be able to perform a read operation on the memory dies in the idle state while the program operation is delayed, the operation rate of a read operation may be improved.

According to some embodiments of the disclosed technology, the write buffer managing unit 155 may improve the read performance by reducing the size of the write buffer 180 in a mixed workload in which write commands and read commands are generated together. The write buffer managing unit 155 may improve program performance by increasing the size of the write buffer 180 in a sequential workload in which write commands are intensively generated. For example, in the example in FIG. 5, the write buffer managing unit 155 may initialize the size of the write buffer 180 on the basis of an interleaving size, and when the mixed workload is detected, the write buffer 180 may change the size of the write buffer 180 on the basis of a one-shot size.

The one-shot size may be a data size programmed by a one-shot program operation. The one-shot program operation is an operation of programming two or more bit data into each memory cell in a physical page in one program operation. The interleaving size may be a data size programmed when the one-shot program operations are parallelly performed on a plurality of memory dies included in the memory device 150. Later, when the sequential workload is detected, the write buffer managing unit 155 may change the size of the write buffer 180 back into the interleaving size.

Figure 3A:
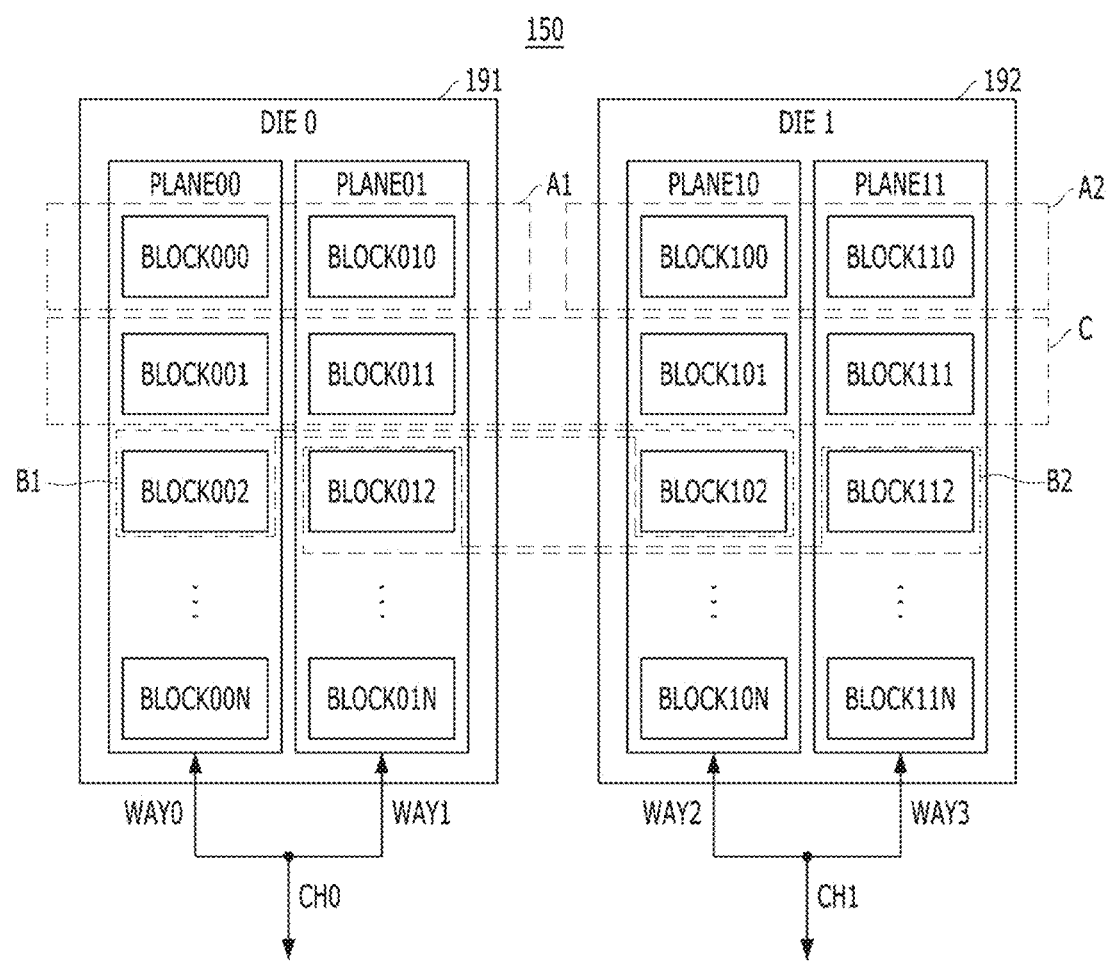
FIG. 3A is a block diagram illustrating an example of a super memory block which is used in a memory system in accordance with an embodiment of the disclosed technology.

FIG. 3A is a diagram illustrating a super memory block used in a memory system in accordance with an embodiment of the disclosed technology. FIG. 3A illustrates in detail constituent elements of the memory device 150 among the constituent element of the memory system 110 shown in FIG. 1 in accordance with an embodiment of the disclosed technology.

The memory device 150 may include a plurality of memory blocks BLOCK000 to BLOCK00N, BLOCK010 to BLOCK01N, BLOCK100 to BLOCK10N and BLOCK110 to BLOCK11N.

The memory device 150 may include a first memory die DIE0 capable of inputting/outputting data through a zeroth channel CH0 and a second memory die DIE1 capable of inputting/outputting data through a first channel CH1. The zeroth and first channels CH0 and CH1 may input/output data in an interleaving scheme.

The first memory die DIE0 may include a plurality of planes PLANE00 and PLANE01 respectively corresponding to a plurality of ways WAY0 and WAY1. The ways WAY0 and WAY1 may input/output data in the interleaving scheme by sharing the zeroth channel CH0.

The second memory die DIE1 may include a plurality of planes PLANE 10 and PLANE 11 respectively corresponding to a plurality of ways WAY2 and WAY3. The ways WAY2 and WAY3 may input/output data in the interleaving scheme by sharing the first channel CH1.

The first plane PLANE00 of the first memory die DIE0 may include a predetermined number of memory blocks BLOCK000 to BLOCK00N among the plurality of memory blocks BLOCK000 to BLOCK00N, BLOCK010 to BLOCK01N, BLOCK100 to BLOCK10N and BLOCK110 to BLOCK11N.

The second plane PLANE01 of the first memory die DIE0 may include a predetermined number of memory blocks BLOCK010 to BLOCK01N among the plurality of memory blocks BLOCK000 to BLOCK00N, BLOCK010 to BLOCK01N, BLOCK100 to BLOCK10N and BLOCK110 to BLOCK11N.

The first plane PLANE10 of the second memory die DIE1 may include a predetermined number of memory blocks BLOCK100 to BLOCK10N among the plurality of memory blocks BLOCK000 to BLOCK00N, BLOCK010 to BLOCK01N, BLOCK100 to BLOCK10N and BLOCK110 to BLOCK11N.

The second plane PLANE11 of the second memory die DIE1 may include a predetermined number of memory blocks BLOCK110 to BLOCK11N among the plurality of memory blocks BLOCK000 to BLOCK00N, BLOCK010 to BLOCK01N, BLOCK100 to BLOCK10N and BLOCK110 to BLOCK11N.

In this manner, the plurality of memory blocks BLOCK000 to BLOCK00N, BLOCK010 to BLOCK01N, BLOCK100 to BLOCK10N and BLOCK110 to BLOCK11N included in the memory device 150 may be divided into groups, according to their physical locations and their use of the ways and channels.

In the specific example in FIG. 3A, two memory dies DIE0 and DIE1 are included in the memory device 150, two planes PLANE00 and PLANE01/PLANE10 and PLANE11 are included in the respective memory dies DIE0 and DIE1, and the predetermined number of memory blocks BLOCK000 to BLOCK00N, BLOCK010 to BLOCK01N, BLOCK100 to BLOCK10N and BLOCK110 to BLOCK11N are included in the respective planes PLANE00 and PLANE01/PLANE10 and PLANE11. It should be noted that, however, the specific illustrated features in FIG. 3A are provided as part of that particular example in FIG. 3A and other implementations with features that are different from the example in FIG. 3A are possible. For example, more or fewer memory dies than two may be included in the memory device 150 and more or fewer planes than two may be included in the respective memory dies, according to the decision of a system designer. The predetermined number of memory blocks included in the respective planes may be also adjusted according to the decision of the system designer.

In various implementations of the disclosed technology, the plurality of memory blocks BLOCK000 to BLOCK00N, BLOCK010 to BLOCK01N, BLOCK100 to BLOCK10N and BLOCK110 to BLOCK11N included in the memory device 150 can be divided depending on their physical locations such as locations of the memory dies DIE0 and DIE1 or the planes PLANE00 and PLANE01/PLANE10 and PLANE11. In some other implementations, the controller 130 may divide the plurality of memory blocks BLOCK000 to BLOCK00N, BLOCK010 to BLOCK01N, BLOCK100 to BLOCK10N and BLOCK110 to BLOCK11N based on which memory blocks are simultaneously selected and operate together. For example, the controller 130 may divide the plurality memory blocks, which are located in different dies or different planes, into super memory blocks each capable of being selected simultaneously among the plurality of memory blocks. Each super memory blocks include memory blocks that are simultaneously selected regardless of their physical locations.

The simultaneous selection scheme of grouping the memory blocks into super memory blocks by the controller 130 may be performed in various manners based on system designs. Herein, three examples of the simultaneous selection scheme will be discussed.

A first example scheme is to group an arbitrary memory block BLOCK000 from the first plane PLANE00 and an arbitrary memory block BLOCK010 from the second plane PLANE01 of the first memory die DIE0 between the memory dies DIE0 and DIE1 included in the memory device 150 and manage the grouped memory blocks BLOCK000 and BLOCK010 as a single super memory block A1. When the first way is applied to the second memory die DIE1 between the memory dies DIE0 and DIE1 included in the memory device 150, the controller 130 may group an arbitrary memory block BLOCK100 from the first plane PLANE10 and an arbitrary memory block BLOCK110 from the second plane PLAN Ell of the second memory die DIE1 and manage the grouped memory blocks BLOCK100 and BLOCK110 as a single super memory block A2.

A second example scheme is to group an arbitrary memory block BLOCK002 from the first plane PLANE00 of the first memory die DIE0 and an arbitrary memory block BLOCK102 from the first plane PLANE10 of the second memory die DIE1 and manage the grouped memory blocks BLOCK002 and BLOCK102 as a single super memory block B1. In addition, according to the second way, the controller 130 may group an arbitrary memory block BLOCK012 from the second plane PLANE01 of the first memory die DIE0 and an arbitrary memory block BLOCK112 from the second plane PLANE11 of the second memory die DIE1 and manage the grouped memory blocks BLOCK012 and BLOCK112 as a single super memory block B2.

A third example scheme is to group an arbitrary memory block BLOCK001 from the first plane PLANE00 of the first memory die DIE0, an arbitrary memory block BLOCK011 from the second plane PLANE01 of the first memory die DIE0, an arbitrary memory block BLOCK101 from the first plane PLANE10 of the second memory die DIE1, and an arbitrary memory block BLOCK111 from the second plane PLANE11 of the second memory die DIE1 and manage the grouped memory blocks BLOCK001, BLOCK011, BLOCK101 and BLOCK111 as a single super memory block C.

The memory blocks included in the respective super memory blocks can be substantially simultaneously selected by the controller 130 through an interleaving scheme, for example, a channel interleaving scheme, a memory die interleaving scheme, a memory chip interleaving scheme, or a way interleaving scheme.

Figure 3B:
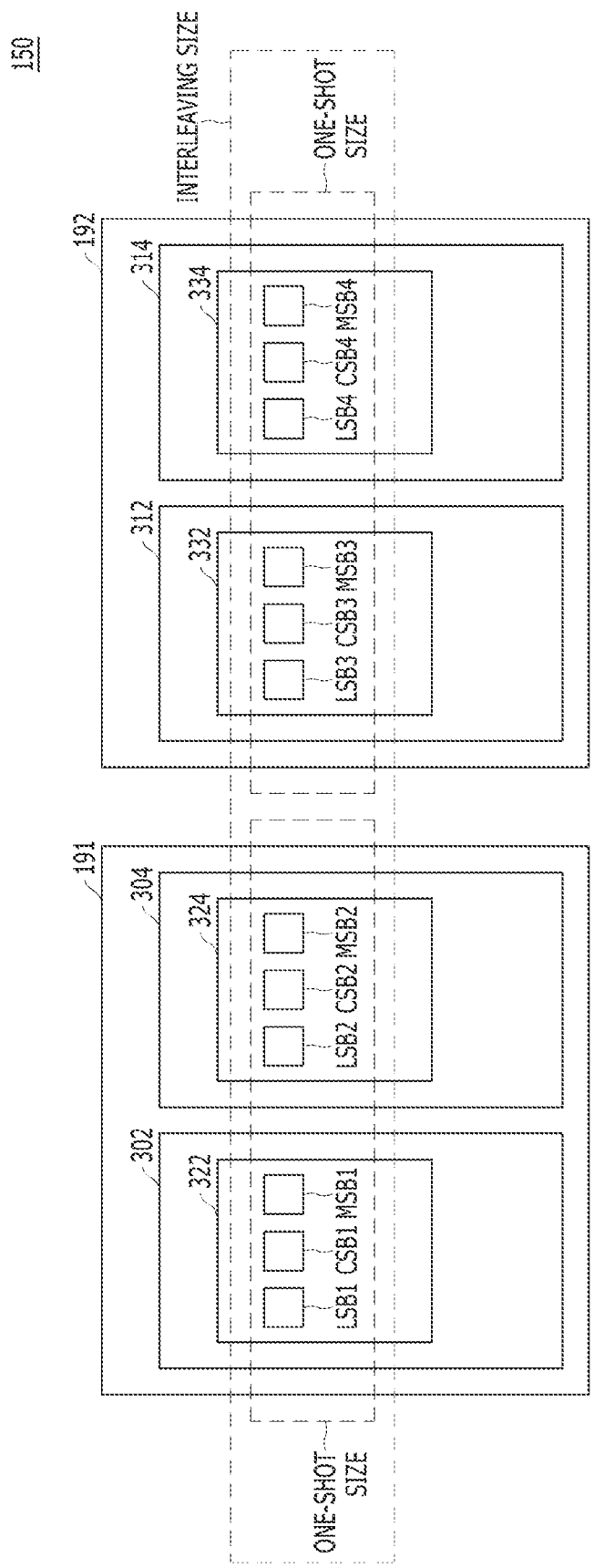
FIG. 3B is a block diagram illustrating examples of a one-shot size and an interleaving size.

FIG. 3B is an example of a block diagram illustrating a one-shot size and an interleaving size.

For the sake of convenience in description, it is assumed that each of the first and second memory dies 191 and 192 include two planes. Also, it is assumed that each of the planes includes a plurality of Triple-Level Cell (TLC) memory blocks. A TLC memory block may include a plurality of pages, each of which includes a plurality of memory cells, each of which may store a 3-bit data.

A single physical page included in a TLC memory block may include three logical pages. The logical pages may include a Least Significant Bit (LSB) page, a Center Significant Bit (CSB) page, and a Most Significant Bit (MSB) page.

The one-shot size may have a value obtained by multiplying the number of planes included in each of the memory dies included in the memory device 150, the number of bits of a data that may be stored in one memory cell, and the size of a single logical page. For example, when a super memory block is formed according to the first method described above with reference to FIG. 3A, the first and second memory blocks 322 and 324 that are included in each of the first and second planes 302 and 304 included in the first memory die 191 may form a super memory block. When program data respectively corresponding to the logical pages LSB1, CSB1, MSB1, LSB2, CSB2, and MSB2 that are positioned at the same offset of the super memory block are stored in the write buffer 180, the controller 130 may control the memory device 150 to simultaneously program the program data into the super memory block. The one-shot size may be the sum of the sizes of all the logical pages LSB1, CSB1, MSB1, LSB2, CSB2, and MSB2 positioned at the same offset of the super memory block.

The interleaving size may have a value obtained by multiplying the number of the memory dies included in the memory device 150 by the one-shot size. For example, the interleaving size may have a value obtained by multiplying the number of memory dies included in the memory device 150 by the number of planes included in each of the memory dies, the number of bits of a data stored in one memory cell, and the size of a single page. For example, when a super memory block is formed according to the third method described above with reference to FIG. 3A, the first to fourth memory blocks 322, 324, 332, and 334 respectively included in the first to fourth planes 302, 304, 312, and 314 included in the first and second memory dies 191 and 192 may form a super memory block.

When the program data respectively corresponding to the logical pages LSB1, CSB1, MSB1, LSB2, CSB2, MSB2, LSB3, CSB3, MSB3, LSB4, CSB4, and MSB4 that are positioned at the same offset as that of the super memory block are stored in the write buffer 180, the controller 130 may control the memory device 150 to program the program data into the super memory block in an interleaving scheme. When the first and second memory dies 191 and 192 are all in an idle state according to the interleaving scheme, the controller 130 may control the memory device 150 to simultaneously perform a program operation on the first and second memory dies 191 and 192. The interleaving size may be the sum of the sizes of all the logical pages LSB1, CSB1, MSB1, LSB2, CSB2, MSB2, LSB3, CSB3, MSB3, LSB4, CSB4, and MSB4 that are positioned at the same offset as that of the super memory block.

Figure 4A:
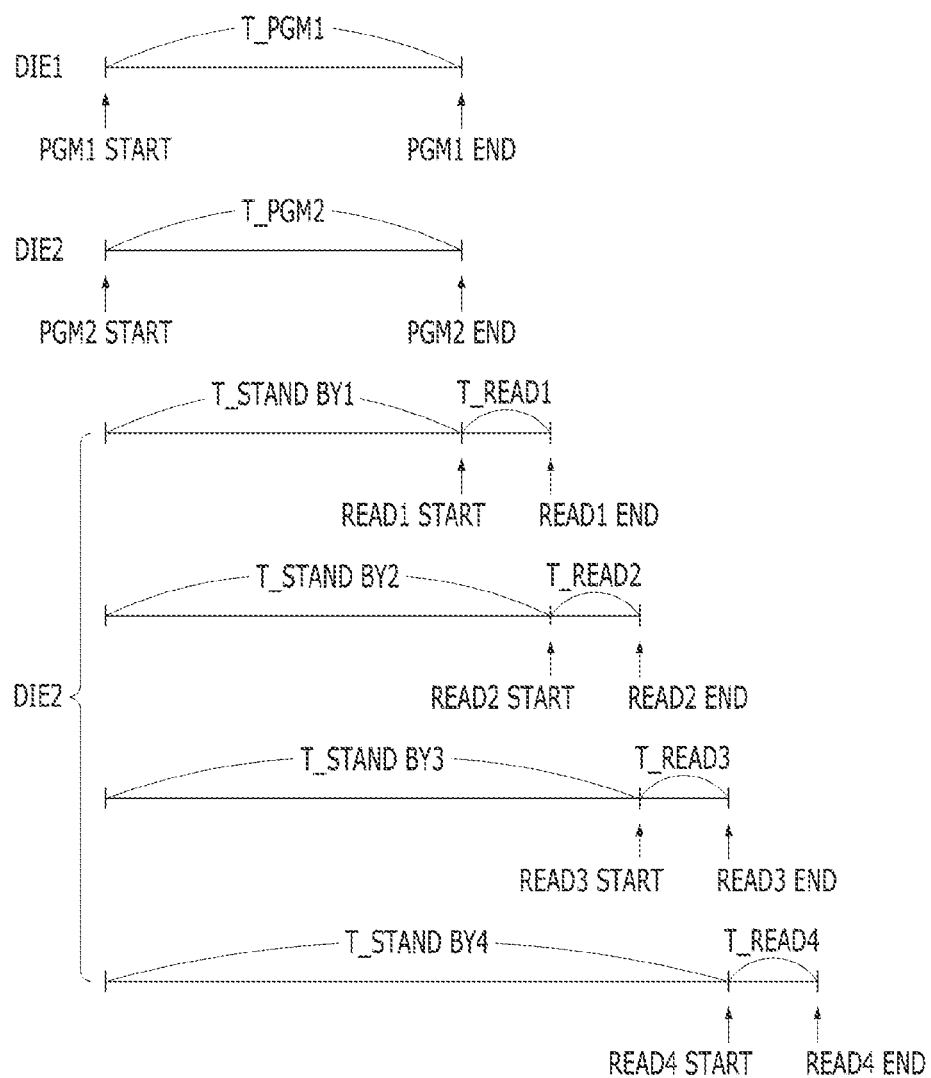
FIGS. 4A and 4B illustrate examples of a program operation and a read operation based on a size of a write buffer.

FIG. 4A illustrates a program operation and a read operation when the write buffer has the size corresponding to the interleaving size.

When the size of the write buffer 180 is same as an interleaving size, the host interface unit 132 may receive, from the host 102, program data as much as the maximum interleaving size. When the program data of the interleaving size is stored in the write buffer 180, the processor 134 may control the memory device 150 to program the program data into the first and second memory dies DIE1 and DIE2 in the interleaving scheme. As shown in FIG. 4A, the processor 134 may control the memory device 150 to perform a second program operation PGM2 on the second memory die DIE2 while performing a first program operation PGM1 on the first memory die DIE1.

In general, the time required for a program operation in a flash memory may be much longer than the time required for a read operation. When a memory die is busy due to a program operation, a read operation on the memory die may be delayed until the program operation is completed. As shown in FIG. 4A, when the first and second program operations PGM1 and PGM2 are simultaneously performed on the first and second memory dies DIE1 and DIE2, respectively, the memory dies DIE1 and DIE2 may be busy while the first and second program operations PGM1 and PGM2 are performed. When the host interface unit 132 receives read commands for the second memory die DIE2 from the host 102 immediately after the first and second program operations PGM1 and PGM2 are performed, the processor 134 may delay the read operations for the read commands until the second program operation PGM2 is completed.

Referring to FIG. 4A, when the size of the write buffer 180 is same as an interleaving size, the processor 134 may control the memory device 150 to simultaneously program the program data, which has the size as much as the interleaving size, into the first and second memory dies DIE1 and DIE2. Therefore, both of the first and second memory dies DIE1 and DIE2 may be switched to a busy state. When the read commands for the second memory die DIE2 is received from the host 102 immediately after the first and second program operations PGM1 and PGM2 are performed, the standby time T_STAND BY for the read commands may increase due to the second program operation PGM2. Since the processor 134 is able to control the memory device 150 to perform first to fourth read operations READ1 to READ4 only after the second program operation PGM2 is completed, there may be a problem of increasing read latency.

Figure 4B:
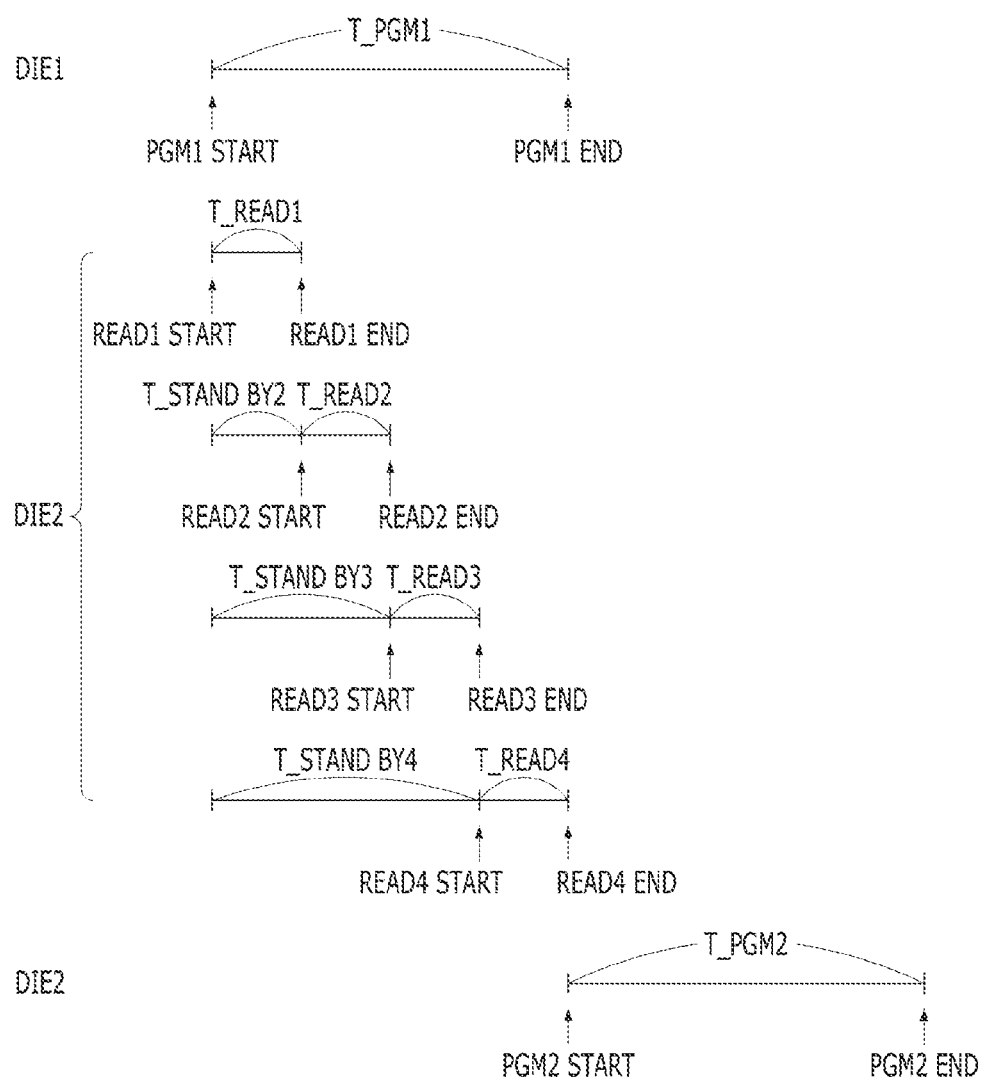

FIG. 4B illustrates a program operation and a read operation when the write buffer has the size corresponding to the one-shot size.

When the size of the write buffer 180 is the one-shot size, the host interface unit 132 may receive, from the host 102, program data whose size is as much as the one-shot size. When the program data of the one-shot size is stored in the write buffer 180, the processor 134 may control the memory device 150 to program the program data into the first memory die DIE1. As shown in FIG. 4B, the host interface unit 132 may not receive new program data from the host 102 while the first program operation PGM1 for the first memory die DIE1 is performed. Thus, the second program operation PGM2 for the second memory die DIE2 may be performed only after the first program operation PGM1 is completed.

Immediately after the first program operation PGM1 is performed, the processor 134 may receive read commands to perform first to fourth read operations READ1 to READ4 on the memory device 150. The processor 103 may control the second memory die DIE2 of the memory device 150 to perform first to fourth read operations READ1 to READ4 while the first memory die DIE1 of the memory device 150 performs the first program operation PGM1. Since the second program operation PGM2 is not performed while the first program operation PGM1 is performed, the processor 134 can control the memory device 150 to perform a read operation on the second memory die which is in an idle state while the first program operation PGM1 is performed. As the size of the write buffer 180 is smaller, the number of busy-state memory dies caused by the program operation may become less. Thus, the processor 134 may be able to reduce the read latency by performing a read operation for the idle-state memory dies immediately after a read command is received.

According to various implementations of the disclosed technology, when a mixed workload is detected, the controller 130 may be able to reduce the read latency by reducing the size of the write buffer 180. This ensures that the maximum read latency has a value smaller than a predetermined threshold value. When a sequential workload is detected later, the size of the write buffer 180 may be increased to improve the program performance. The controller 130 may be able to improve the program performance as well as preventing the read latency from increasing by dynamically changing the size of the write buffer 180 according to the workload.

Figure 5:
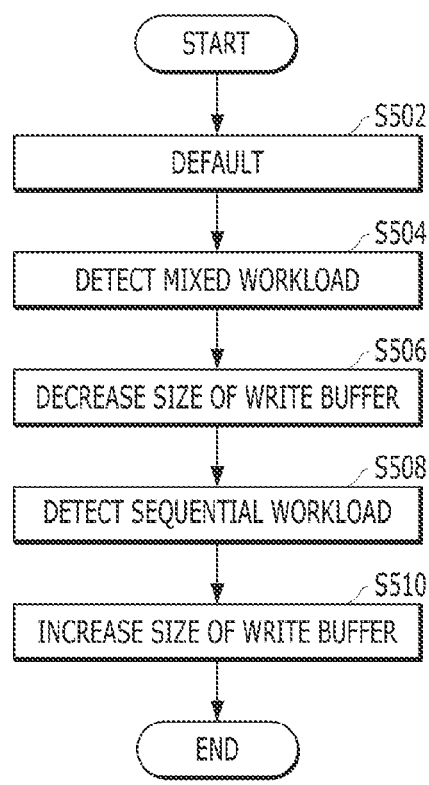
FIG. 5 is a flowchart describing an operating of a memory system in accordance with an embodiment of the disclosed technology.

FIG. 5 is a flowchart describing an operating of a memory system in accordance with an embodiment of the disclosed technology.

In step S502, the write buffer managing unit 155 may set a default value DEFAULT for the size of the write buffer 180 to an interleaving size. For example, the initial value of the size of the write buffer 180 may be the interleaving size.

In step S504, the workload detecting unit 125 may detect the current workload to be a mixed workload. The workload detecting unit 125 may increase a read count whenever a read command is received, and when the read count is greater than a first threshold value TH1, the workload detecting unit 125 may detect the current workload to be a mixed workload.

Figure 6:
FIG. 6 is a block diagram illustrating an example of a mixed workload.

FIG. 6 is a block diagram illustrating the mixed workload.

The mixed workload may refer to a workload in which write commands and read commands are provided to be mixed from the host 102 to the host interface unit 132. For example, the mixed workload may refer to a workload in which a read command is provided between write commands that are provided from the host 102 to the host interface unit 132. According to the embodiment of the disclosed technology, the workload detecting unit 125 may increase the read count whenever a read command is received and, when the read count is greater than the first threshold value TH1, it may detect the current workload to be the mixed workload.

Figure 7:
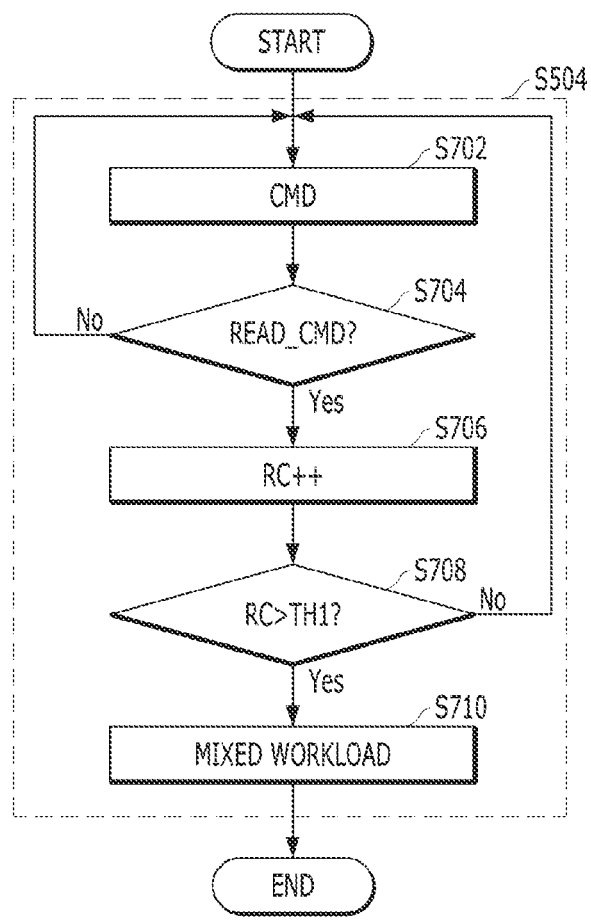
FIG. 7 is a flowchart describing an example of a process of detecting a mixed workload.

FIG. 7 is a flowchart describing a process S504 of detecting a mixed workload.

In step S702, the host interface unit 132 may receive a command provided from the host 102.

In step S704, the workload detecting unit 125 may determine the type of the command received in the step S702. The workload detecting unit 125 may determine whether the command is a read command or not. When the command is not a read command ('N' in the step S704), the process may return to the step S702 and the host interface unit 132 may receive another command from the host 102.

In step S706, when the command received in the step S702 is a read command ('Y' in the step S704), the workload detecting unit 125 may increase the read count. For example, the workload detecting unit 125 may store the read count in the memory 144.

In step S708, the workload detecting unit 125 may compare the read count which is increased in the step S706 with the first threshold value TH1. When the read count is equal to or smaller than the first threshold TH1 ('N' in the step S708), the process may return to the step S702, and the host interface unit 132 may receive another command provided from the host 102.

In step S710, when the read count which is increased in the step S706 is greater than the first threshold value TH1 ('Y' in the step S708), the workload detecting unit 125 may detect the current workload to be a mixed workload MIXED WORKLOAD.

Referring back to FIG. 5, in step S506, the write buffer managing unit 155 may change the size of the write buffer 180 based on whether the mixed workload is detected or not. The write buffer managing unit 155 may reduce the size of the write buffer 180 when the mixed workload is detected. For example, when the mixed workload is detected, the write buffer managing unit 155 may reduce the size of the write buffer 180 into a one-shot size.

In step S508, after the size of the write buffer 180 is reduced in the step S506, the workload detecting unit 125 may detect the current workload to be a sequential workload based on the write count.

Figure 8:
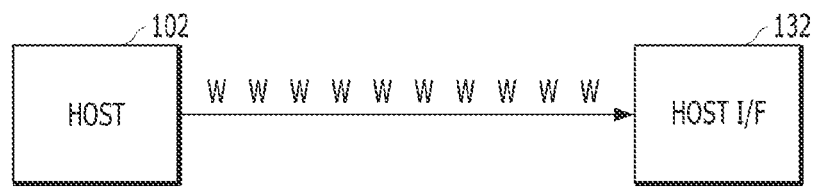
FIG. 8 is a block diagram illustrating an example of a sequential workload.

FIG. 8 is a block diagram illustrating a sequential workload.

The write commands that are intensively provided from the host 102 to the host interface unit 132 may form a sequential workload. The sequential workload may refer to a workload in which only write commands are consecutively provided. According to the embodiment of the disclosed technology, the workload detecting unit 125 may reset the write count upon receiving a read command, and may increase the write count whenever a write command is received. Then, when the write count becomes greater than a second threshold value TH2, the workload detecting unit 125 may detect the current workload to be a sequential workload.

Figure 9:
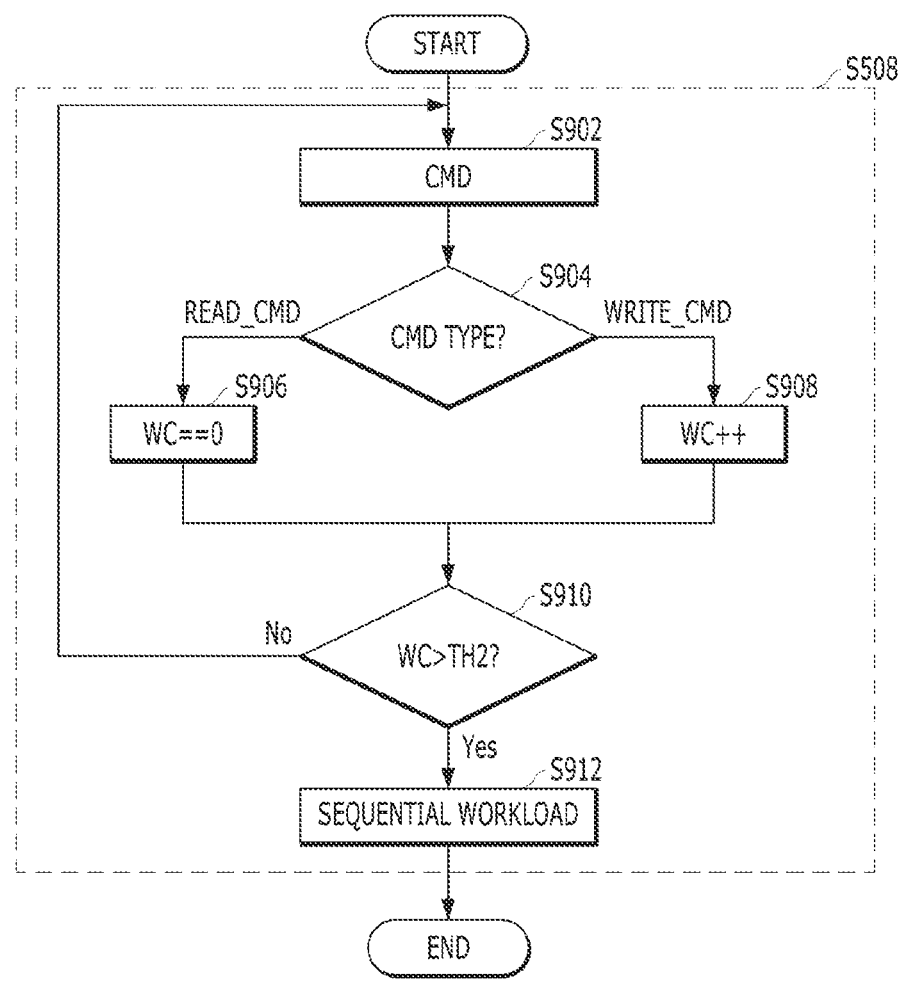
FIG. 9 is a flowchart illustrating an example of a process of detecting a sequential workload.

FIG. 9 is a detailed flowchart describing a process of detecting a sequential workload.

In step S902, the host interface unit 132 may receive a command provided from the host 102.

In step S904, the workload detecting unit 125 may determine the type of the command received in the step S902. The workload detecting unit 125 may determine whether the command is a read command or not.

In step S906, when the command received in the step S902 is a read command ('READ_CMD' in the step S904), the workload detecting unit 125 may reset the write count WC. For example, the workload detecting unit 125 may set the write count WC to have a value of '0'. For example, the workload detecting unit 125 may store the write count WC in the memory 144.

In step S908, when the command received in the step S902 is a write command ('WRITE_CMD' in the step S904), the workload detecting unit 125 may increase the write count WC.

In step S910, the workload detecting unit 125 may compare the write count WC which is increased in the step S908 with the second threshold value TH2. When the write count WC is equal to or smaller than the second threshold value TH2 ('N' in the step S910), the host interface unit 132 may return to the step S902 to receive another command provided from the host 102.

In step S912, the workload detecting unit 125 may detect the current workload to be a sequential workload SEQUENTIAL WORKLOAD when the write count WC which is increased in the step S908 is greater than the second threshold value TH2 ('Y' in the step S910). According to the embodiment of the disclosed technology, the workload detecting unit 125 may reset the write count WC whenever a read command is provided from the host 102, and when the write count WC is greater than the second threshold, the workload detecting unit 125 may detect the current workload to be a sequential workload, a workload in which only write commands are intensively provided from the host 102.

Referring back to FIG. 5, in step S510, the write buffer managing unit 155 may change the size of the write buffer 180 based on whether the sequential workload is detected or not. When the sequential workload is detected, the write buffer managing unit 155 may increase the size of the write buffer 180. For example, when the sequential workload is detected, the write buffer managing unit 155 may increase the size of the write buffer 180 to the interleaving size.

Figure 10:
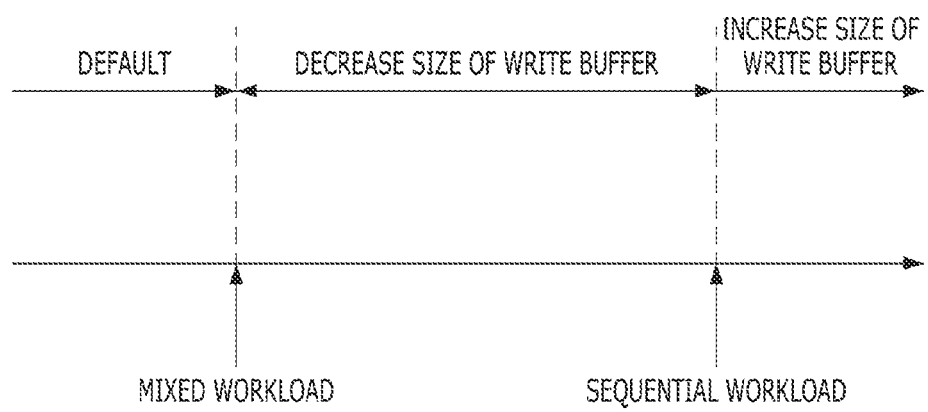
FIG. 10 is a diagram illustrating an example of a process of changing a size of a write buffer based on a workload in accordance with an embodiment of the disclosed technology.

FIG. 10 is a diagram illustrating a process of changing the size of the write buffer 180 based on the workload in accordance with an embodiment of the disclosed technology.

The write buffer managing unit 155 may set a default value DEFAULT for the size of the write buffer 180 to an interleaving size. For example, the initial value of the size of the write buffer 180 may be the interleaving size, and the write buffer 180 may temporarily store program data provided from the host 102.

The workload detecting unit 125 may increase a read count whenever a read command is received, and when the read count is greater than the first threshold value TH1, the workload detecting unit 125 may detect the current workload to be a mixed workload. The write buffer managing unit 155 may reduce the size of the write buffer 180 when the mixed workload is detected. For example, when the mixed workload is detected, the write buffer managing unit 155 may reduce the size of the write buffer 180 to a one-shot size.

The workload detecting unit 125 may reset the write count upon receiving the read command, and may increase the write count whenever the write command is received. The workload detecting unit 125 may detect the current workload to be a sequential workload when the write count is greater than the second threshold value TH2. When the sequential workload is detected, the write buffer managing unit 155 may increase the size of the write buffer 180 to the interleaving size.

Figure 11:
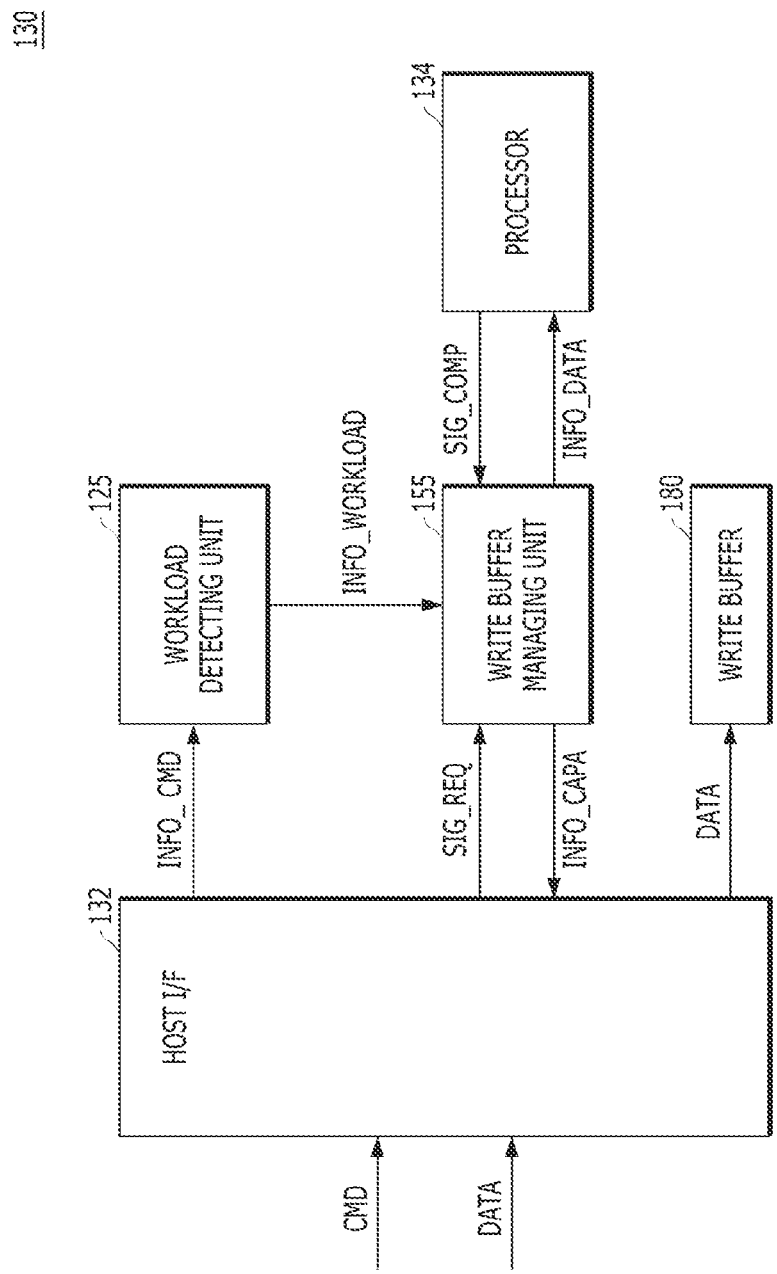
FIG. 11 is a block diagram illustrating an example of a controller in accordance with an embodiment of the disclosed technology.

FIG. 11 is a block diagram illustrating an example of a controller in accordance with an embodiment of the disclosed technology.

The host interface unit 132 may receive a command CMD from the host 102. The command CMD may include a read command or a write command. When the host interface unit 132 receives the write command, the host interface unit 132 may provide a request signal SIG_REQ to the write buffer managing unit 155. The write buffer managing unit 155 may provide information INFO_CAPA about the available capacity of the write buffer 180 to the host interface unit 132 in response to the request signal SIG_REQ. When the available capacity of the write buffer 180 is larger than the size of the program data DATA corresponding to the write command based on the information INFO_CAPA about the available capacity of the write buffer 180, the host interface unit 132 may receive the program data from the host 102. The host interface unit 132 may temporarily store the provided program data in the write buffer 180. Also, the host interface unit 132 may provide the workload detecting unit 125 with information INFO_CMD about the command.

The workload detecting unit 125 may detect the current workload to be a sequential workload or a random workload based on the information INFO_CMD for the provided command. The workload detecting unit 125 may increase the read count whenever the host interface unit 132 receives a read command. The workload detecting unit 125 may reset the write count whenever the read command is received. The workload detecting unit 125 may increase the write count whenever the host interface unit 132 receives the write command. The workload detecting unit 125 may detect the current workload to be a mixed workload when the read count is greater than the first threshold value. The workload detecting unit 125 may detect the current workload to be a sequential workload when the write count is greater than the second threshold value. When the workload detecting unit 125 detects the current workload to be a sequential workload or a mixed workload, the workload detecting unit 125 may provide information INFO_WORKLOAD about the workload to the write buffer managing unit 155.

The write buffer managing unit 155 may dynamically change the size of the write buffer 180 based on the provided information INFO_WORKLOAD about the workload. The write buffer managing unit 155 may set a default value of the size of the write buffer 180 to an interleaving size. Then, when a mixed workload is detected later, the write buffer managing unit 155 may reduce the size of the write buffer 180 to a one-shot size. After that, when a sequential workload is detected again, the write buffer managing unit 155 may increase the size of the write buffer 180 back to the interleaving size. The write buffer managing unit 155 may provide the processor 134 with information INFO_DATA about the size of data stored in the write buffer 180. When a completion signal SIG_COMP for the program operation for the data stored in the write buffer 180 is provided from the processor 134, the write buffer managing unit 155 may delete the data stored in the write buffer 180.

When the size of the write buffer 180 is reduced, the number of memory dies in which a program operation is being performed may be reduced and the number of memory dies in an idle state may increase. The processor 134 may reduce the read latency by controlling the memory device 150 to perform a read operation on the memory dies in the idle state while a program operation, which requires a relatively long time, is performed. Also, when the size of the write buffer 180 is reduced, as described earlier with reference to FIG. 2, the host interface unit 132 may not be able to receive a large amount of new program data from the host 102. Thus, the read command may be given priority over the write command. Therefore, when the size of the write buffer 180 is reduced, the read performance may be further improved because the number of read commands processed per unit time increases.

When the size of the write buffer 180 is increased, the processor 134 may control the memory device 150 to simultaneously program the program data of the interleaving size into several memory dies by using the interleaving scheme. Since the program performance is improved when the size of the write buffer 180 is increased, the write buffer managing unit 155 may increase the size of the write buffer 180 when a sequential workload is detected. The write buffer managing unit 155 may be able to preferentially improve the program performance in a workload in which only write commands are intensively generated and improve the read performance in a workload in which read commands and write commands are generated together by dynamically changing the size of the write buffer 180 according to the workload.

The processor 134 may control the memory device 150 to program the data stored in the write buffer 180 into a memory block based on the information INFO_DATA about the size of the data stored in the write buffer 180 provided from the write buffer managing unit 155. When the size of the data stored in the write buffer 180 forms a program unit, for example, a one-shot size or an interleaving size, the processor 134 may control the memory device 150 to program the data in the memory block. Also, the processor 134 may control the memory device 150 to perform a read operation on a read command. When the program operation is completed, the processor 134 may provide a completion signal SIG_COMP to the write buffer managing unit 155.

According to the embodiment of the disclosed technology, when a workload is detected as a mixed workload, the memory system may reduce the size of the write buffer so as to improve read performance. When the workload is detected as a sequential workload, the memory system may increase the size of the write buffer so as to improve program performance.

While the disclosed technology has been described with respect to the specific embodiments and/or examples, various features including certain changes and modifications that are not specifically disclosed in the specific embodiments and/or examples, may be made based on what is disclosed and illustrated in this patent document.

What is claimed is:

1. A memory system, comprising:
   a memory device including a plurality of memory blocks; and
   a controller suitable for dynamically changing a size of a write buffer based on whether a current workload is a sequential workload or a mixed workload in which read commands are provided between write commands together with the write commands,
   wherein the controller comprises:
   a workload detecting unit suitable for increasing a write count for the write commands when a write command is received, increasing a read count for the read commands when a read command is received, and initiating the write count when the read command is received.

2. The memory system of claim 1, wherein the controller further comprises:
   a write buffer managing unit suitable for reducing the size of the write buffer when the mixed workload is detected.

3. The memory system of claim 2, wherein the workload detecting unit is configured to detect the current workload to be the mixed workload when the read count is greater than a first threshold value, and detect the current workload to be the sequential workload when the write count is greater than a second threshold value.

4. The memory system of claim 3, wherein when the sequential workload is detected after reducing the size of the write buffer, the write buffer managing unit is configured to increase the size of the write buffer, and when the mixed workload is detected, the write buffer managing unit is configured to change the size of the write buffer to a one-shot unit.

5. The memory system of claim 4, wherein when the sequential workload is detected after the size of the write buffer is changed to the one-shot unit, the write buffer managing unit is configured to change the size of the write buffer to an interleaving unit.

6. The memory system of claim 4, wherein the memory blocks are divided into a first memory die and a second memory die, each the first memory die and the second memory die including a first memory block and a second memory block, and
   wherein the controller further comprises:
   a processor suitable for controlling a read operation or a program operation of the memory device,
   wherein when data having the size of the one-shot unit is stored in the write buffer, the processor is configured to control the memory device to perform the read operation on the second memory die and perform the program operation of programming the data into the first memory die.

7. The memory system of claim 1, wherein the controller further comprises:
   a host interface unit suitable for receiving the write command, the read command, and program data corresponding to the write command from a host,
   wherein when a remaining capacity of the write buffer is greater than a size of the program data corresponding to the write command, the host interface unit is configured to communicate with the host to receive the write command from the host.

8. The memory system of claim 4, wherein the write buffer managing unit is configured to set an initial value of the size of the write buffer to an interleaving unit,
   wherein the interleaving unit is a value obtained by multiplying the number of memory dies included in the memory device by the one-shot unit.

9. The memory system of claim 8, wherein the one-shot unit is a value obtained by multiplying the number of planes included in each of the memory dies included in the memory device by the number of bits of a data that may be stored in one memory cell and a size of a single page.

10. The memory system of claim 6, wherein when data having a size of an interleaving unit is stored in the write buffer, the processor is configured to control the memory device to program the data into the first and second memory dies in an interleaving scheme.

11. A method for operating a memory system, comprising:
increasing a write count for a write command when the write command is received, and a read count for a read command when the read command is received;
detecting a current workload to be a mixed workload when the read count is greater than a first threshold value;
detecting the current workload to be a sequential workload when the write count is greater than a second threshold value; and
dynamically changing a size of a write buffer based on whether the current workload is the mixed workload or the sequential workload,
wherein the dynamically changing the size of the write buffer includes:
reducing the size of the write buffer when the mixed workload is detected.

12. The method of claim 11, wherein the dynamically changing the size of the write buffer further includes:
increasing the size of the write buffer when the sequential workload is detected after reducing the size of the write buffer.

13. The method of claim 12, wherein the reducing of the size of the write buffer includes:
changing the size of the write buffer to a one-shot unit when the mixed workload is detected.

14. The method of claim 13, wherein the increasing the size of the write buffer includes:
changing the size of the write buffer to an interleaving unit when the sequential workload is detected after changing the size of the write buffer to the one-shot unit.

15. The method of claim 13, further comprising:
performing a read operation or a program operation,
wherein the performing of the read operation or the program operation includes:
when data having a size of the one-shot unit is stored in the write buffer, performing the read operation on an idle memory die while the data stored in the write buffer is programmed.

16. The method of claim 15, further comprising:
deleting the data from the write buffer when the data stored in the write buffer is programmed.

17. The method of claim 11, further comprising:
receiving the write command, the read command, and program data corresponding to the write command from a host,
wherein the receiving of the write command, the read command, and the program data corresponding to the write command from the host includes:
receiving the program data from the host when a remaining capacity of the write buffer is greater than a size of the program data corresponding to the write command.

18. A memory system, comprising:
a memory device including a plurality of memory blocks; and
a controller coupled to the memory device and configured to receive write commands from a host outside of and in communication with the memory system, the controller including a memory including a write buffer,
wherein the controller comprises:
a workload detecting unit configured to increase a read count in response to a read command received when a current workload is a sequential workload; and
a write buffer managing unit communicatively coupled to the workload detecting unit and configured to change a size of the write buffer inside the memory of the controller based on whether the current workload is changed to a mixed workload or the sequential workload.

19. The memory system of claim 18, wherein the workload detecting unit changes the current workload to the mixed workload in response to the read count greater than a first threshold value.

20. The memory system of claim 19, wherein when the current workload is the mixed workload, the workload detecting unit is configured to increase the write count in response to a write command received, initialize the write count in response to a read command received, and change the current workload to the sequential workload in response to the write count greater than a second threshold value, and
wherein the write buffer managing unit is configured to increase the size of the write buffer in response to changing the current workload to the sequential workload.

* * * * *